United States Patent [19]

Moutardier

[11] Patent Number: 4,709,586

[45] Date of Patent: Dec. 1, 1987

[54] SPRING-DRIVEN GYROSCOPE

[75] Inventor: Jacques Moutardier, Le Plessis Robinson, France

[73] Assignee: Aerospatiale Societe Nationale Industrielle, Paris, France

[21] Appl. No.: 941,043

[22] Filed: Dec. 12, 1986

[30] Foreign Application Priority Data

Dec. 20, 1985 [FR] France .................. 85 18958

[51] Int. Cl.$^4$ .................. G01C 19/26; F03G 1/00
[52] U.S. Cl. .................. 74/5.12; 74/5.7; 185/45
[58] Field of Search .................. 74/5.12, 5.7; 185/45, 185/37

[56] References Cited

U.S. PATENT DOCUMENTS

| | | | |
|---|---|---|---|
| 950,848 | 3/1910 | Gardner | 185/45 X |
| 1,276,456 | 8/1918 | Vasselli | 185/45 |
| 1,337,385 | 4/1920 | Boas | 185/45 |
| 1,389,953 | 9/1921 | Loebker | 185/45 |
| 1,421,404 | 7/1922 | Cheney | 185/37 X |
| 1,699,964 | 1/1929 | Green | 185/45 |
| 2,911,832 | 11/1959 | Thierman | 74/5.12 X |
| 3,270,568 | 9/1966 | Moravek et al. | 74/5.12 |
| 3,434,354 | 3/1969 | Voge | 74/5.12 |
| 3,449,960 | 6/1969 | Kleiman | 74/5.12 X |
| 4,053,029 | 10/1977 | Darda | 185/37 X |
| 4,305,304 | 12/1981 | Jessup et al. | 74/5.12 |
| 4,606,239 | 8/1986 | Guerin | 74/5.12 |

FOREIGN PATENT DOCUMENTS 2365784  4/1978  France .................. 74/5.12

Primary Examiner—Rodney H. Bonck
Attorney, Agent, or Firm—Fisher Christen & Sabol

[57] ABSTRACT

The invention relates to a gyroscope which is comprised of a hollow rotor adapted to rotate about a fixed shaft, a leaf spring housed inside the rotor, one end of which is releasably connected to the fixed shaft and the second end of the spring is fixedly connected to the rotor, the spring being able to store energy by the tensioning of the spring. The releasable connection has a finger, borne by the fixed shaft, which extends transversely with respect to the fixed shaft and is capable of being engaged in an opening made in the first end of the spring.

The invention is more particularly applicable to gyroslopes.

8 Claims, 8 Drawing Figures

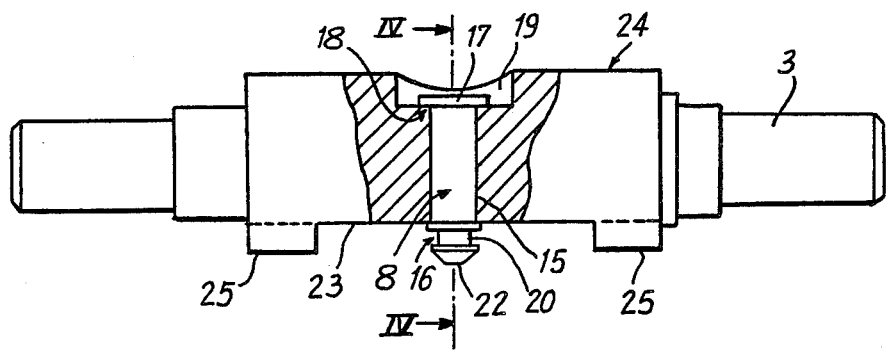
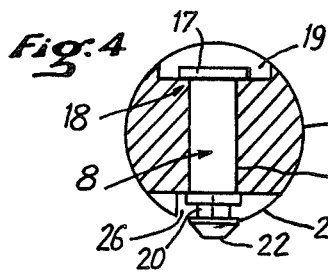
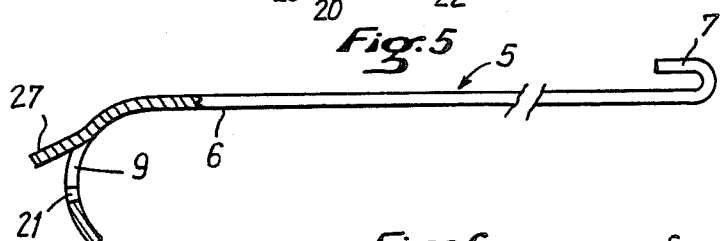
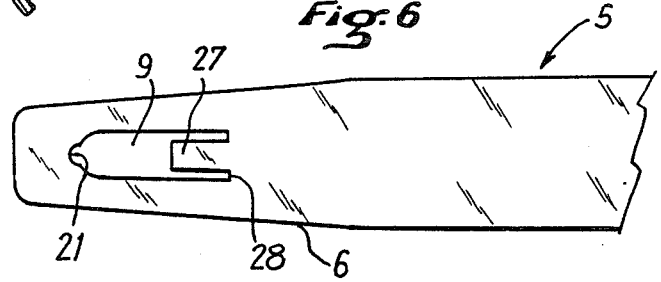
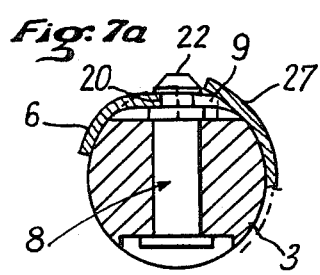
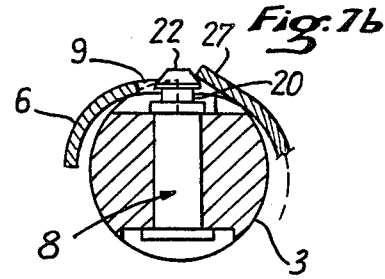

SPRING-DRIVEN GYROSCOPE

The present invention relates to a gyroscope of which the rotation of the rotor is provoked by the release of a spring.

U.S. Pat. No. 4,305,304 already describes a gyroscope of the type comprising:

a hollow rotor capable of rotating about a fixed shaft which traverses it, a leaf spring housed inside the rotor and spirally surrounding said fixed shaft, first and second connecting means for respectively joining a first end of the spring to the fixed shaft and the second end of the spring to the rotor, with the result that it is possible to store energy in the spring by tensioning it, means for blocking the rotor with respect to the fixed shaft in a position for which the spring is tensioned, means for controlling the blocking means in order to unblock the rotor so that the latter is driven in rotation by the release of the spring, said first connecting means being such that the connection that they establish is broken at the end of release of the spring.

The major drawback of the gyroscope described in U.S. Pat. No. 4,305,304 lies in the fact that the particular configuration of the connecting means between said first end of the spring and the fixed shaft does not allow a perfectly reliable fastening of the spring on the fixed shaft. In fact, in that case, said first end of the spring, curved on itself, is engaged in a longitudinal slot in the fixed shaft. Now, such a fastening does not absorb high mechanical stresses without risk of rupture of the connection between the end of the spring and the fixed shaft by said end opening. The spring may thus become prematurely unfastened, either during tensioning of the spring or during release thereof, before having furnished the maximum energy.

It is therefore an object of the present invention to avoid this drawback by providing a gyroscope comprising connecting means between the end of the spring and the fixed shaft designed so that, in all cases, rupture of the connection that they establish effectively occurs only at the end of the release of the spring when the latter has furnished the maximum energy.

To that end, the gyroscope of the type described hereinabove is noteworthy, according to the invention, in that said first connecting means comprise a finger, borne by the fixed shaft, which extends at least substantially transversely with respect to the longitudinal axis of the fixed shaft and which is capable of being engaged in an opening made in said first end of the spring.

Contrary to what is described in U.S. Pat. No. 4,305,304, this particular design of said connection means ensures a fastening between the spring and the fixed shaft adapted to support high mechanical stresses both during tensioning of the spring and during release thereof, said connection being breakable only after the maximum energy has been furnished to the rotor.

According to another feature of the invention, said finger is provided with a groove for fastening the front edge of the opening made in the first end of the spring, and the transverse and longitudinal dimensions of the opening are such that they allow a relative movement between the finger and the opening, as well as the disengagement of the finger from the opening at the end of release of the spring. Said opening is generally oblong in shape in the longitudinal direction of the spring.

Thanks to the groove provided in the finger, this allows a still more reliable fastening between the spring and the fixed shaft, during tensioning of the spring or during release thereof, whilst ensuring the spontaneous liberation of the end of the spring at the end of release thereof, thanks to the possibility of relative movement between the finger and the opening.

According to a further feature of the invention, said first end of the spring comprises a tongue fixed on that part of the edge of the opening opposite the one intended to be fastened in said groove, which tongue, with the spring in tensioned position, is inclined outwardly with respect to the fixed shaft, its free end lying in contact with or in the vicinity of the head of said finger.

In particular, the head of said finger presents a ramp on which said tongue may slide at the end of release of the spring.

At the end of release of the spring, the natural tendency of the end of the spring to move away from the fixed shaft, which moving away immediately follows a slight forward displacement of said end with the result that the front edge of its opening escapes the groove of the finger, is thus promoted by the slide of the tongue over the head of the finger, this at the same time avoiding the risk of the opposite edge of the opening, due to too great a forward displacement of the end of the spring, being blocked against the finger, thus preventing the rupture of the connection between the spring and the fixed shaft.

In a particular embodiment of the invention, the finger is generally cylindrical in form, its groove being annular, whilst its head may be generally truncated in form, the lateral surface thereof serving as slide ramp for said tongue.

In addition, the finger may be partly housed in a transverse recess in the fixed shaft.

According to a further feature of the invention, the radius of curvature of said first end of the spring, in the non-tensioned state of the spring, is greater than the radius of curvature thereof once the spring has been fastened to said finger and tensioned.

This particular feature reinforces the natural tendency, indicated hereinabove, of the end of the spring to move away from the fixed shaft at the end of release of the spring, thus facilitating rupture of the connection between the spring and the fixed shaft.

Finally, as far as the second end of the spring is concerned, it may be curved on itself so as to be fastened to a catch provided on the inner lateral wall of the rotor.

The invention will be more readily understood on reading the following description with reference to the accompanying drawings, in which:

FIG. 3 is a schematic view, in part section, of the fixed shaft of the gyroscope of the invention.

FIG. 4 is a view in section along line IV—IV of FIG. 3.

FIG. 5 is a view in part section of the spring before it is positioned in the gyroscope.

FIG. 6 is a plane view of the first end of the spring in the non-curved state.

FIGS. 7a and 7b are schematic views in transverse section of the fixed shaft and the corresponding end of the spring, with the spring in the tensioned state and during liberation of the spring, respectively.

Figure 1:
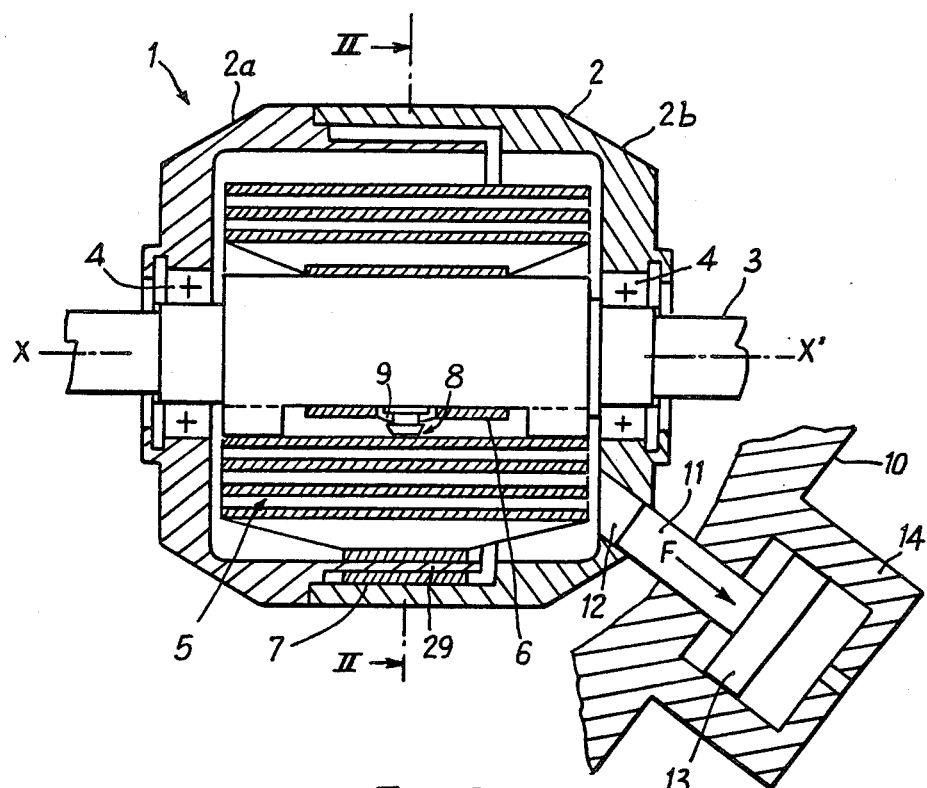
FIG. 1 is a schematic view in axial section of the gyroscope of the invention.
Figure 2:
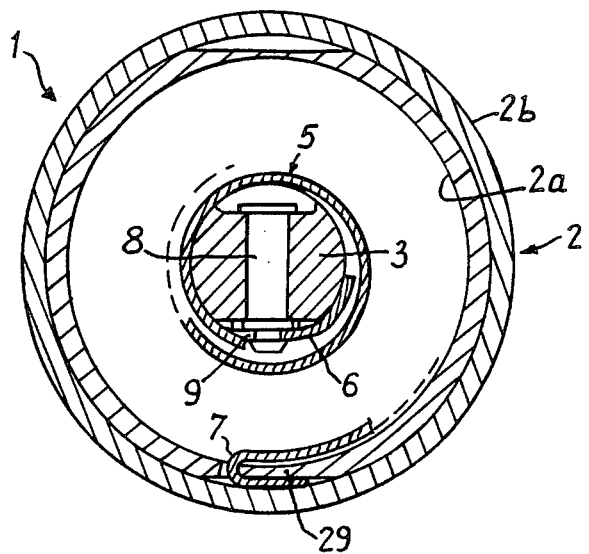
FIG. 2 is a view in section along line II—II of FIG. 1.

Referring now to the drawings and more particularly to FIGS. 1 and 2, the gyroscope 1 of the invention comprises a hollow rotor 2 adapted to rotate about a fixed shaft 3 passing therethrough on bearings 4 constituted for example by ball bearings.

A leaf spring 5 is housed inside the rotor 2 and spirally surrounds the fixed shaft 3. A first end 6 of the spring 5 is connected to the fixed shaft 3 and the second end 7 of the spring 5 is connected to rotor 2, with the result that it is possible to store energy in spring 5 by tensioning it.

According to the invention, fixed shaft 3 bears a finger 8 which extends at least substantially transversely with respect to the longitudinal axis X—X' of fixed shaft 3, and which is adapted to be engaged in an opening 9 made in the first end 6 of spring 5, the connection between the first end 6 of spring 5 and fixed shaft 3 being intended to be broken at the end of release of spring 5.

In the example shown, rotor 2 is constituted by two parts 2a, 2b assembled together, for example, by screwing. The assembly of the rotor and fixed shaft is housed in a casing, of which only part 10 has been shown in FIG. 1 in order to render the drawing clearer.

In this part 10 of the casing are provided means for blocking rotor 2 as well as means for controlling said blocking means in order to unblock the rotor so that it may be driven in rotation by the release of the spring. These blocking and control means are constituted, in the example described, by a piston rod 11 adapted to slide in a bore 12 in rotor 2. The piston 13 associated with rod 11 may move in the cylinder 14 under the action, for example, of a small pyrotechnical charge or any other appropriate means (not shown), so that rod 11 may retract, liberating rotor 2 which is thus driven by spring 5 which is released all at once.

Referring more particularly to FIGS. 3 and 4, finger 8, partly housed in a transverse recess 15 in fixed shaft 3, presents an end 16 which projects from fixed shaft 3 and which is adapted to be fastened in opening 9 in the corresponding end 6 of spring 5. Finger 8 may be fixed in transverse recess 15 by any appropriate means, such as a crimp 17, provided, at its other end 18, in a hollow 19 made in fixed shaft 3 in line with the transverse recess 15.

End 16 of finger 8, projecting with respect to fixed shaft 3, is provided with a groove 20 for fastening the front edge 21 (FIGS. 5 and 6) of opening 9 in end 6 of spring 5, end 6 itself being considered as the front end of spring 5.

In the example shown, finger 8 is generally cylindrical in form, and groove 20 is annular, whilst the head 22 of finger 8 is generally truncated in form. As is clearly shown in FIGS. 3 and 4, end 16 of finger 8 projects with respect to a flat portion 23 extending longitudinally in the central part 24 of largest diameter of shaft 3. It will be noted that the flat portion 23 does not extend as far as ends 25 of said central part 24 where aligned longitudinal grooves 26 are provided which serve as references making it possible to monitor, for example visually, the positioning of end 6 of spring 5 with respect to finger 8.

Referring now more particularly to FIGS. 5 and 6, the transverse and longitudinal dimensions of the opening 9 made in end 6 of spring 5 are such that they allow a relative movement between finger 8 and opening 9, and the disengagement of the finger from the opening at the end of release of the spring. As may be seen more clearly in FIG. 6 where the end 6 of spring 5 is shown in the non-curved state, opening 9 is generally oblong in form in the longitudinal direction of spring 5.

So as to facilitate rupture of the connection between end 6 of spring 5 and fixed shaft 3 at the end of release of the spring, said end 6 of spring 5 comprises a tongue 27 fixed on that part 28 of the edge of opening 9 opposite part 21 intended to be fastened in groove 20. Tongue 27, with spring 5 in tensioned position, is inclined outwardly with respect to fixed shaft 3 and its free end is in contact with or in the vicinity of the head 22 of finger 8, by sliding thereon during release of spring 5 so as to allow liberation of the spring at the end of this release.

It will be noted that the radius of curvature of end 6 of spring 5, with the spring in non-tensioned state, is greater than the radius of curvature thereof once spring 5 has been fastened to finger 8 and tensioned. As indicated previously, this facilitates ejection of end 6 of the spring from finger 8 at the end of release of said spring.

Finally, the second end 7 of spring 5 is curved on itself so as to fasten on a catch 29 provided beneath the inner lateral wall of rotor 2.

The gyroscope of the invention operates as follows:

Once end 6 of spring 5 is fastened to finger 8, spring 5 is tensioned so as to store energy therein, then rotor 2 is blocked, thanks to piston rod 11 which is introduced into bore 12 in rotor 2, in the position for which spring 5 is tensioned.

In this position, the front edge 21 of opening 9 in end 6 of spring 5 is fastened in groove 20 of finger 8, whilst the free end of tongue 27 is in contact with head 22 of finger 8 (FIG. 7a), or at least in the vicinity thereof.

At the desired moment, rotor 2 is liberated, for example by firing a small pyrotechnical charge whose action allows retraction of piston rod 11 in the direction of arrow F (FIG. 1), and is driven in rotation by the sudden release of spring 5.

At the end of release of spring, the connection between end 6 thereof and finger 8 is broken. In fact, at that moment, the natural tendency of end 6 of spring 5 to move away from fixed shaft 3, which moving away immediately follows a slight forward displacement of said end so that the front edge 21 of its opening 9 escapes groove 20 of finger 8, is promoted by the slide of tongue 27 on head 22, forming ramp, of finger 8 (FIG. 7b).

After rupture of the connection between end 6 of spring 5 and finger 8, spring 5 is applied against the inner wall of rotor 2, thus increasing the mass of the rotor and consequently its kinetic moment. Consequently, the rotor rapidly attains its maximum speed.

What is claimed is:

1. In a gyroscope, of the type comprising:
   a hollow rotor adapted to rotate about a fixed shaft traversing it,
   a leaf spring housed inside the rotor and spirally surrounding said fixed shaft,
   first and second connection means for respectively joining a first end of the spring to the fixed shaft and the second end of the spring to the rotor, with the result that it is possible to store energy in the spring by tensioning it,
   means for blocking the rotor with respect to the fixed shaft in a position for which the spring is tensioned, means for controlling the blocking means in order to unblock the rotor so that it is driven in rotation by the release of the spring, said first connection means being such that the connection that they establish is broken at the end of release of the spring, said first connection means comprising a finger borne by a fixed shaft which is capable of being engaged in an opening in the first end of said spring; said finger being provided with a groove for fastening the front edge of the opening in the first end of the spring, the transverse and longitudinal dimensions of said opening allowing a relative movement between the finger and said opening; said spring having a tongue fixed on that part of the edge of the opening opposite that to be held in said groove, which tongue, with the spring in a tensioned position, is inclined outwardly with respect to the fixed shaft, its free end lying in contact with or in the vicinity of the end of said finger.

2. The gyroscope of claim 1, wherein said opening is generally oblong in shape in the longitudinal direction of the spring.

3. The gyroscope of claim 1, wherein the head of said finger presents a ramp on which said tongue may slide at the end of release of the spring.

4. The gyroscope of claim 1, wherein said finger is generally cylindrical in form, and said groove is annular.

5. The gyroscope of claim 4, wherein said finger has a head portion above said groove, the head portion being generally truncated in form.

6. The gyroscope of claim 1, wherein the fixed shaft presents a transverse recess for partly housing said finger therein.

7. The gyroscope of claim 1, wherein the radius of curvature of said first end of the spring, in the non-tensioned state of the spring, is greater than the radius of curvature thereof once the spring has been fastened to said finger and tensioned.

8. The gyroscope of claim 1, wherein said second end of the spring is curved on itself so as to be fastened to a catch provided on the inner lateral wall of the rotor.

* * * * *